United States Patent [19]
Michon

[11] 3,838,390
[45] Sept. 24, 1974

[54] NEW OPERATIONAL DISPOSITION FOR OBTAINING THREE-DIMENSIONAL SEISMIC INFORMATION

[75] Inventor: Dominique Michon, Paris, France

[73] Assignee: Compagnie Generale de Geophysique, Paris, France

[22] Filed: Nov. 7, 1972

[21] Appl. No.: 304,561

[30] Foreign Application Priority Data
Nov. 8, 1971 France .............................. 71.39918
Feb. 8, 1972 France .............................. 72.04100

[52] U.S. Cl. .................. 340/15.5 MC, 340/15.5 CP
[51] Int. Cl. ........................... G01v 1/16, G01v 1/20
[58] Field of Search .............. 340/15.5 MC, 15.5 CP

[56] References Cited
UNITED STATES PATENTS

| | | | |
|---|---|---|---|
| 3,450,225 | 6/1969 | Silverman | 340/15.5 MC |
| 3,529,282 | 9/1970 | Brown et al. | 340/15.5 MC |
| 3,539,984 | 11/1970 | Schneider | 340/15.5 CP |
| 3,597,727 | 8/1971 | Judson | 340/15.5 MC |
| 3,731,270 | 5/1973 | Perhollow | 340/15.5 MC |

*Primary Examiner*—Maynard R. Wilbur
*Assistant Examiner*—N. Moskowitz
*Attorney, Agent, or Firm*—Donald D. Jeffery

[57] ABSTRACT

In a seismic prospecting operational disposition for obtaining three-dimensional seismic information, pickups and shotpoints are distributed in correspondence with a two-dimensional grid of reflector-points, each reflector-point giving rise to a plurality of elementary paths passing through a shotpoint, reflector-point and pickup, permitting mixing of the elementary traces to form a common depth-point stack.

10 Claims, 4 Drawing Figures

NEW OPERATIONAL DISPOSITION FOR OBTAINING THREE-DIMENSIONAL SEISMIC INFORMATION

FIELD OF THE INVENTION

The present invention concerns seismic prospecting by seismic reflection methods.

The general principle of these methods is as follows: To obtain information on the structure of terrain to be studied, at least one shock is generated from a seismic source disposed on the surface or at a slight depth. The generation of the shock results in the propagation of seismic waves in all the layers of the terrain, this propagation being effected as a function of the nature and disposition of the different formations. Seismic reflection is primarily concerned with waves reflected by the interfaces separating the different layers which act as reflectors for the shock waves or seismic rays generated by the source and whose behaviour is conventionally assimilated to that of light rays in a transparent medium.

The detection of the reflected waves is effected by means of a series of pickups (or groups of pickups) such as geophones or hydrophones. The pickups receive a series of signals forming "traces" corresponding to the shocks from different sources after reflection by the seismic reflectors. To each source-pickup couple there corresponds an elementary trace obtained by reflection from an elementary reflector. The signals from the different pickups (or pickup groups) recorded generally on a magnetic support, for example on a disc or tape.

Throughout the following and for simplifying the description, it should be understood the "geophone" or "pickup" denotes immaterially a detector-recorder system comprising either a single pickup (geophone or hydrophone) or a group of such pickups, all connected to the same seismic amplifier. Similarly, by shotpoint, there will be denoted any source site, independently of the nature of the source, the position of the shotpoint being understood to be the geographical centre of groups of shotpoints used together for producing one and the same shock, or used separately for producing a number of shocks resulting in recorded signals which will be added together. Similarly, by reflector points will be denoted the sites of the different elementary reflectors.

Generally speaking, once the seismic information or traces have been obtained, it is known to process them in various ways to facilitate the utilisation of the information they contain.

It is possible first of all to carry out filtering for improving the signal-to-noise ratio. It is also possible to correct each trace statically, that is to say, to eliminate the effect of the relief and surface zone exposed to the air, and dynamically, that is to say, to eliminate the influence of the distance separating the source from the geophone. It is thus possible to reduce each trace to what it would be if the source and the geophone were merged into one point, for example vertically above an elementary reflector in a horizontally reference plane (trace in reflector position). Under these conditions, it is also possible to combine, that is to say, add together a number of traces whose reflections are kept in phase. Such quite conventional compositing or mixing emphasizes the reflected waves and eliminates noise, that is to say, parasitic waves, particularly surface waves.

DESCRIPTION OF THE PRIOR ART

In a special application, called "common depth point stack," the traces coming from different sources are mixed and recorded on different geophones such that the corresponding reflector-point is the same for each geophone-source pair, all the pairs thus formed having a common symmetry axis. As reference document on common depth point stack, U.S. Pat. No. 2,732,906 may be consulted.

It may generally be stated that hitherto, in most cases, a linear or substantially linear operational disposition is used. In other words, in conventional prospecting, the geophones and shotpoints are distributed substantially on a straight line for detecting points which are in the vertical plane (profile) passing through the said straight line.

For some time, it has become apparent that the aforesaid conventional methods of working in profile did not enable the dip of each seismic event to be recorded in magnitude and direction.

BACKGROUND OF THE INVENTION

It is the essential purpose of the present invention to provide a new systematic operation disposition of seismic prospecting characterised by a distribution of pickups and shotpoints corresponding to a two-dimensional grid of reflector-points, each reflector-point giving rise to a plurality of elementary shotpoint-reflector-point-pickup tracks permitting mixing of elementary traces to give a common depth-point stack.

The information thus obtained (elementary traces or traces obtained after mixing) whereby it is possible by the application of known techniques of processing traces of different cross profiles, preferably in a plotter, to determine the dip of any seismic event, which may be located in space according to three coordinates (three-dimensional determination).

The invention also proposes an optimum organisation of the operational disposition, that is to say an optimum two-dimensional distribution of the geophones and shotpoints for detecting the said two-dimensional grid of reflector-points.

Analysis of the problem first of all shows that the two-dimensional grid should have an elementary mesh having the shape of a parallelogram, preferably a rectangle or better still a square.

It is also essential to limit the investments necessary on the site and in this connection tests carried out by the applicants show that the number of shotpoints need not be appreciably greater than that usually found for conventional common depth-point stack surveys.

Finally, it appears necessary not to modify too abruptly working habitudes both on the terrain and at the stage of interpreting the recordings.

The present invention also provides a simple and elegant solution to these problems which constitutes an optimum compromise between the necessities of prospecting (minimum number of shotpoints, simple laws of advance and distribution) and the processing requirements (wealth of information and ease of processing it).

DESCRIPTION OF THE INVENTION

To do this, the pickups or geophones, which conventionally may be 24 or 48 in number, are linearly distributed equidistantly on an axis preferably a central axis of the operation disposition, the said axis being parallel to the general direction of prospecting advance and being referred to in the following as geophone axis. The shotpoints are distributed on a plurality of lines parallel to the said axis, one line coinciding or not coinciding with it, the distance between lines being preferably but not necessarily equal to the interval between geophones. On each line thus defined, the shotpoints are distributed regularly with a spacing equal to a whole number of times the interval between geophones.

It is also possible to adopt a disposition as indicated above, in which the shotpoints take the place of the pickups and vice versa.

It is in fact well known that the position of a reflector-point remains unchanged if the respective positions of the pickup and shot point are reversed, the path of the shock, shotpoint-reflector-pickup, remaining physically the same and merely the direction of propagation being reversed.

There is thus obtained a disposition in which the shotpoints are linearly distributed equidistantly on an axis parallel to the general prospecting direction (profile axis). The pickups are distributed on a plurality of lines parallel to the said axis, equidistant from each other, it being possible for one line to coincide or not to coincide with the said axis, the distance between lines being or not being equal to the distance between shotpoints. On a line thus defined, the pickups are distributed regularly with a spacing equal to a whole number of times the interval between shotpoints.

BRIEF DESCRIPTION OF THE DRAWINGS

The following description made with reference to the accompanying drawings, given solely by way of non-restrictive examples, will enable the manner in which the invention may be put into effect to be better understood.

In the accompanying drawings.

In all the figures, the geophones are represented by Greek crosses +, the reflector points by St. Andrew crosses x and the shotpoints by small circles.

DESCRIPTION OF PREFERRED EMBODIMENTS

Figure 1A:
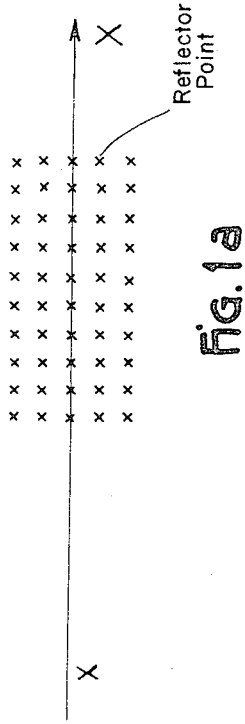
FIG. 1a represents the two-dimensional grid of reflector-points obtained in correspondence with the operational disposition of FIG. 1.
Figure 1:
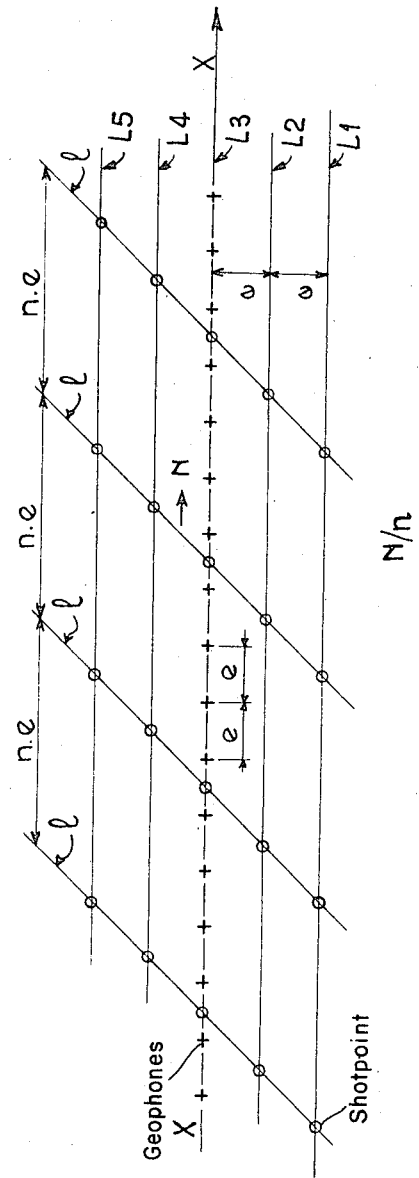
FIG. 1 represents the new organisation of an operational disposition according to the invention.

In FIG. 1, the geophones are distributed on the central prospecting axis X—X in an equidistant manner, a spacing $e$ separating two adjacent geophones.

In this example, the shotpoints are distributed on 5 parallel lines $L_1$, $L_2$, $L_3$, $L_4$, $L_5$, one of the lines coinciding with the axis X—X, the spacing between adjacent lines being uniformly equal to $e$.

On each of the lines thus defined, the shotpoints are regularly distributed, being separated from each other by an interval $n$ times $e$ ($ne$) ($n$ being a whole number equal to or greater than unity). In the organisation shown in FIG. 1, the shotpoints are projected on X—X at the centre of the geophone intervals, this position of the projections not being a condition of the invention.

Preferably, as shown in FIG. 1, the axial positions of the shotpoints of a line relative to the adjacent line are offset regularly by $e$ from one line to the next, such that finally the shotpoints of the different lines are projected at the centre of all the intervals between geophones. The shotpoints are thus also equally regularly distributed on lines $l$ parallel to one another, being oblique lines inclined at 45° to the X—X, each of the five lines being derived from the preceding line by a translation parallel to X—X over the length $n \cdot e$.

With such a disposition, a profile is obtained which is formed by a band comprising a homogeneous density of reflector-points (FIG. 1a). These different reflector points are distributed in five lines according to a two-dimensional net, having a square mesh of dimension $e/2$.

Each reflector point corresponds to a plurality of elementary paths from shotpoint to reflector point to pickup. By mixing elementary traces according to the common depth-point stack technique, composite traces in reflector position distributed in five lines are obtained..

It is also possible to carry out mixing while retaining only events in phase, or generally if a set of traces in the reflector position is taken into consideration, for example a square of 25 traces, it is possible to determine completely, in the three-dimension, the dip of any seismic event.

Figure 2:
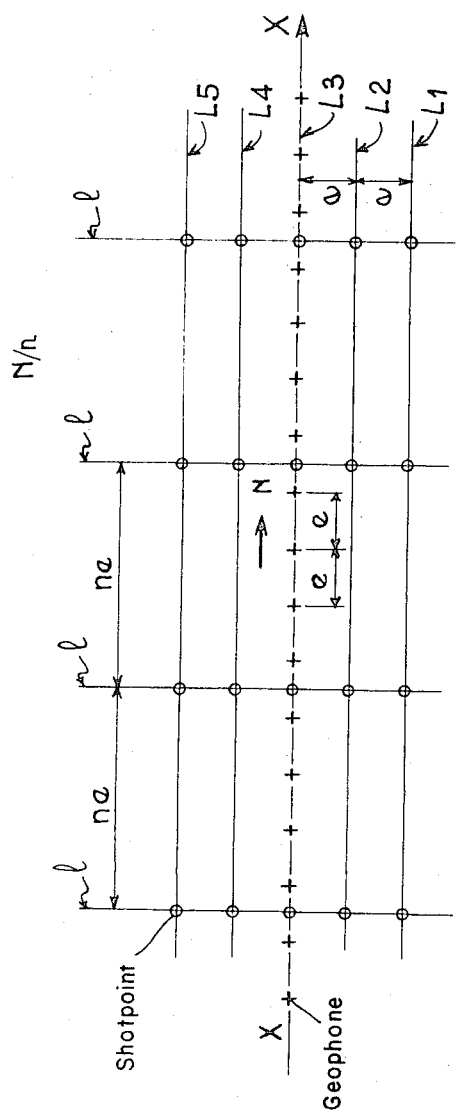
FIG. 2 represents another embodiment of the operational disposition according to the invention.

FIG. 2 shows an embodiment modification of the disposition of FIG. 1 in which the said lines $l$ are perpendicular to X—X.

Figure 3:
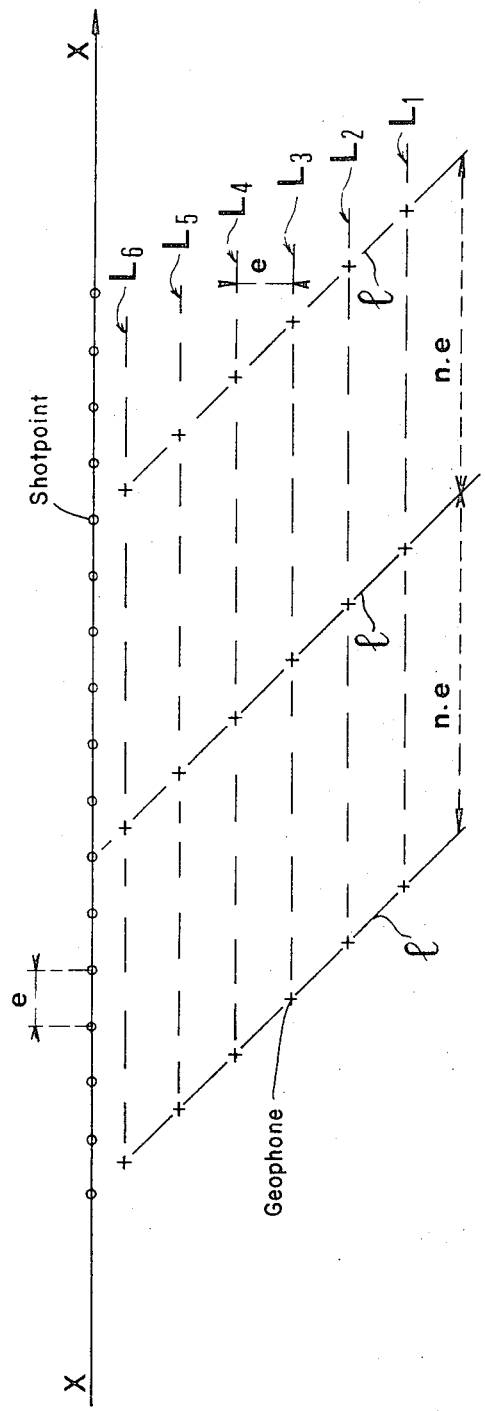
FIG. 3 represents another embodiment of the operational disposition according to the invention.

In the case of FIG. 3, the shotpoints are distributed evenly on an axis X—X parallel to the prospecting direction, being separated by a uniform spacing $e$. The pickup or geophones are distributed on six lines $L_1$, $L_2$, $L_3$, $L_4$, $L_5$, $L_6$, parallel to one another and to the axis X—X, the spacing between adjacent lines being uniformly equal to $e$.

On each of the lines thus defined, the pickups are evenly distributed, being separated from one another by an interval $n \cdot e$ ($n$ being a whole number).

Preferably also, the axial positions of the pickups of a line relative to the adjacent lines are offset regularly by $e$ from one line to the other, so that the pickups are thus distributed regularly on a plurality of oblique lines $l$ inclined at 45° to the X—X axis, each line $l$ being derived from the adjacent line by a translation parallel to X—X over a length $ne$.

With such a disposition, similarly to what was obtained for the dispositions of FIG. 1 and 2, there is obtained a profile formed of a band comprising a homogeneous density of reflector-points distributed in six lines according to a two-dimensional net having a square mesh of $e/2$.

In an embodiment modification, the aforesaid lines $l$ are perpendicular to X—X.

It should also be noted that the new disposition of FIG. 3 is particularly interesting in the case where surface sources (drop weights, vibrators, etc.) are used at the shotpoints, these surface sources being mounted on a vehicle; it appears advantageous in practice to be able to move these vehicles along a single line (the X—X axis).

It should be well understood that in some applications, the pickups (or shotpoints) may be so disposed that none of them is projected in some of the intervals between shotpoints (or pickups). It is also possible to dispose them so that a number of them are projected onto the same point in some intervals, all these modifications being obvious for the person versed in the art and permitting adjustment of the total length on which are projected the pickups (or shotpoints) used together for the same recording.

I claim:

1. A method of seismic prospecting comprising the steps of positioning seismic energy emitting shotpoints and seismic energy receiving pickups at or near the surface, relating said shotpoints and pickups to a two-dimensional grid of seismic energy reflector points located on a sub-surface reflection stratum such that each of said reflector points will give rise to a plurality of elementary energy paths through a shotpoint, said reflector point and a pickup point, emitting seismic energy from each shotpoint and receiving reflected energy at each pickup, and mixing the plurality of energy signals to form a common depth point stack for each said reflector point.

2. The method of seismic prospecting of claim 1, wherein said grid of reflector points is a net whose mesh is a parallelogram.

3. The method of seismic prospecting of claim 2, wherein said parallelogram is a rectangle.

4. The method of seismic prospecting of claim 1, wherein said pickups are distributed linearly on an axis parallel to the prospecting direction and are spaced regularly from one another, and said shotpoints are distributed on a plurality of lines parallel to said axis and, on each line, said shotpoints are distributed regularly at an interval equal to said pickup spacing or an integral multiple thereof.

5. The method of seismic prospecting of claim 4, wherein said lines of shotpoints are offset from one line to the next by a spacing equal to said spacing between pickups.

6. The method of seismic prospecting of claim 4 wherein said shotpoints are disposed on lines perpendicular to said pickup axis.

7. The method of seismic prospecting of claim 5, wherein said shotpoints are disposed on an odd number of lines parallel to said pickup axis, the middle line coinciding with said axis.

8. The method of seismic prospecting of claim 1, wherein said shotpoints are distributed linearly on an axis parallel to the prospecting direction and regularly spaced from one another, said pickups are distributed on a plurality of lines parallel to said axis, and on each line, said pickups are distributed regularly at an interval equal to said spacing of said shotpoints or an integral multiple thereof.

9. The method of seismic prospecting of claim 8, wherein said pickup lines are progressively offset from one line to the next by a spacing equal to said spacing between shotpoints.

10. The method of seismic prospecting of claim 9, wherein said pickups are disposed on six lines parallel to said shotpoint axis.

* * * * *

Notice of Adverse Decision in Interference

In Interference No. 99,309, involving Patent No. 3,838,390, D. Michon, NEW OPERATIONAL DISPOSITION FOR OBTAINING THREE-DIMENSIONAL SEISMIC INFORMATION, final judgment adverse to the patentee was rendered Sept. 17, 1979, as to claims 1-3, 8 and 9.

[*Official Gazette, April 1, 1980.*]